June 30, 1953 F. BOWERS ET AL 2,643,737
APPARATUS FOR SEPARATING PARTICLES FROM GASES
Filed July 6, 1950 5 Sheets-Sheet 1
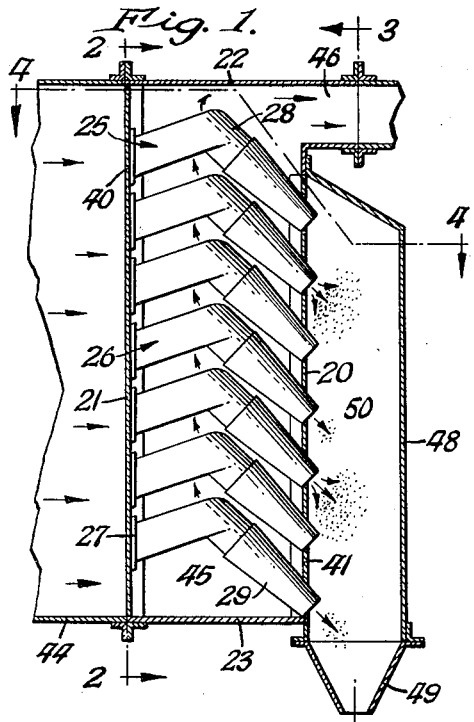
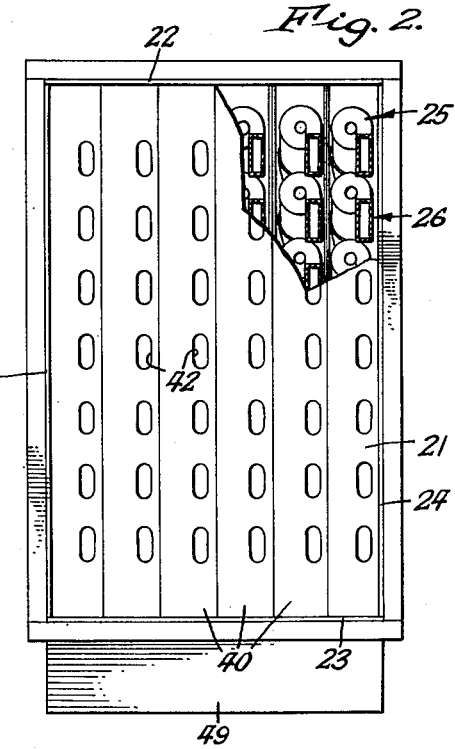
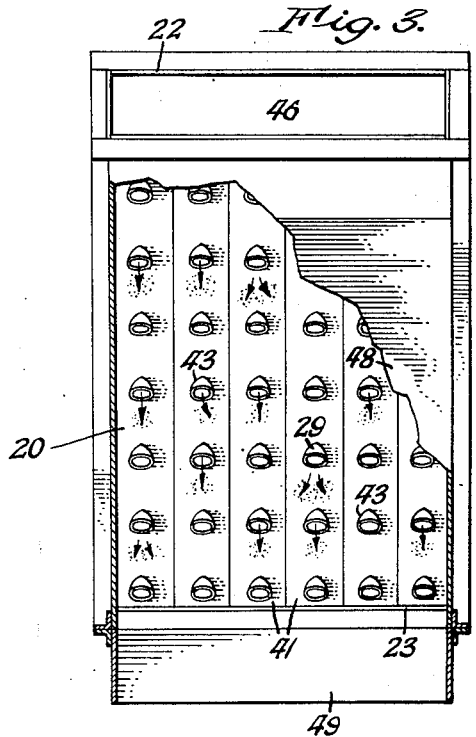
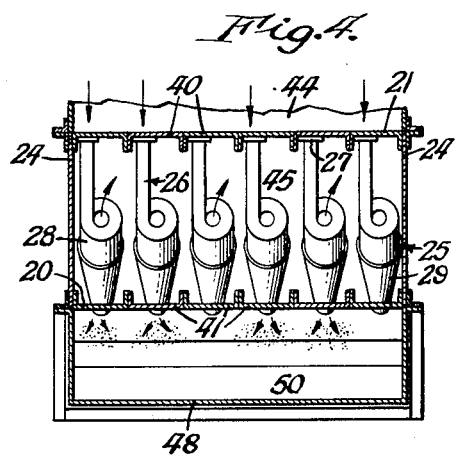
INVENTORS
Frank Bowers
Roger S. Brookman
BY Popp and Sommer
Attorneys.

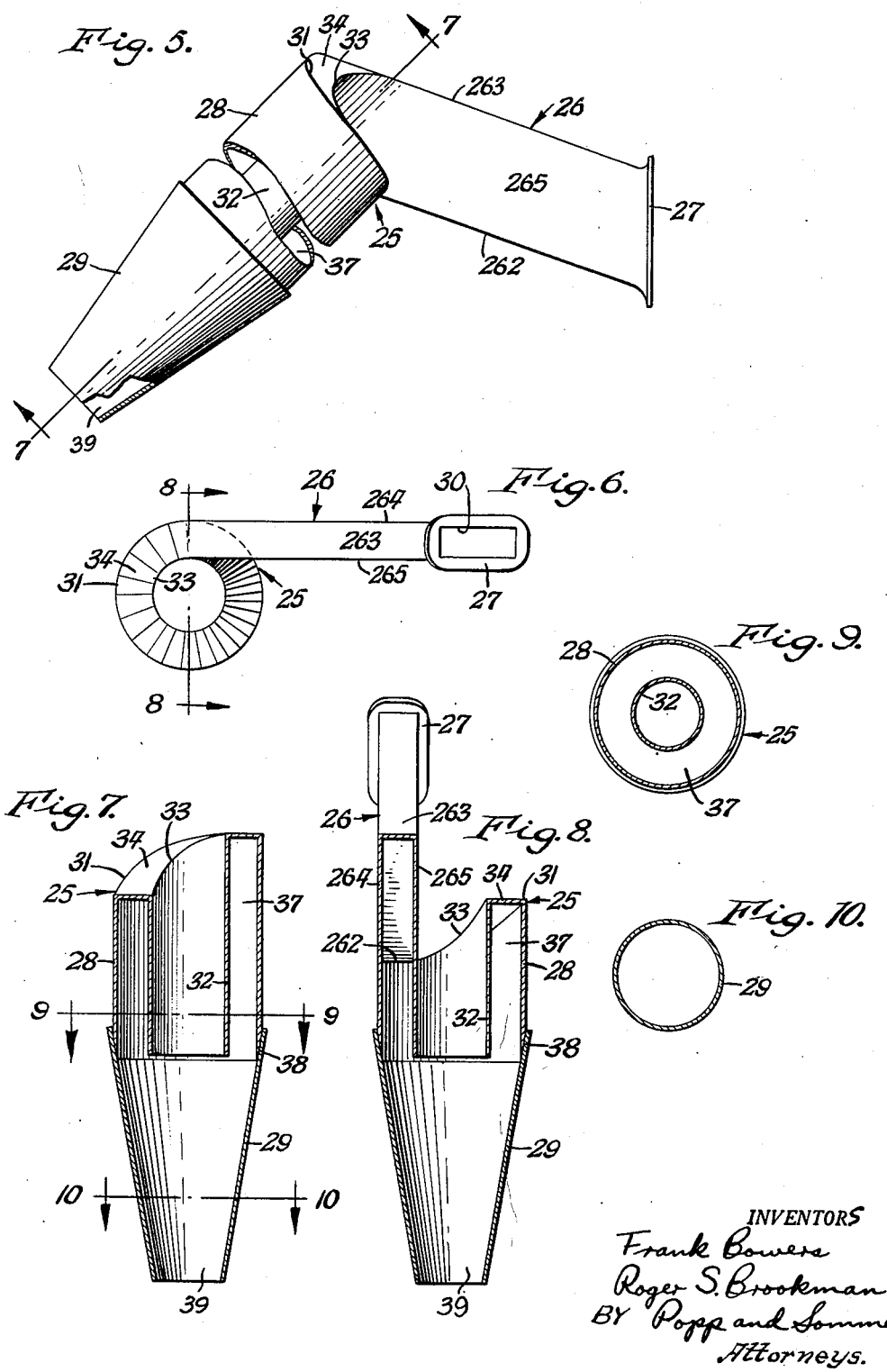

June 30, 1953 F. BOWERS ET AL 2,643,737
APPARATUS FOR SEPARATING PARTICLES FROM GASES
Filed July 6, 1950 5 Sheets-Sheet 4
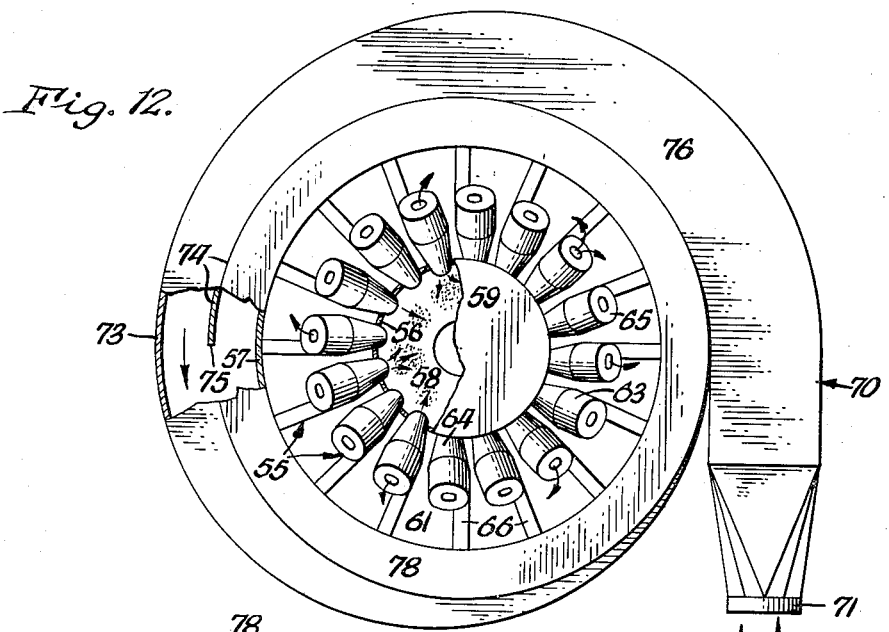
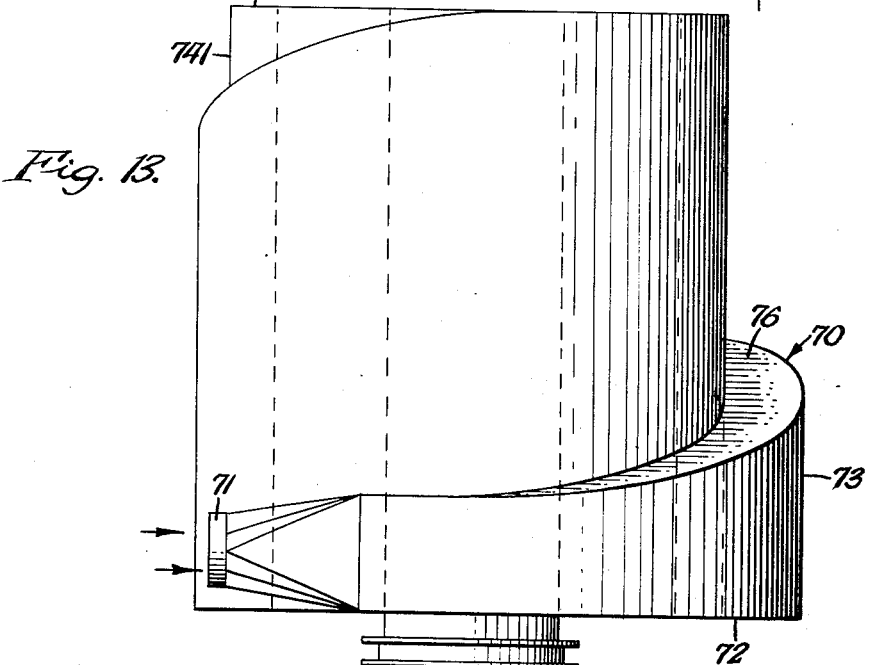
INVENTORS
Frank Bowers
Roger S. Brookman
BY Popp and Sommer
Attorneys.

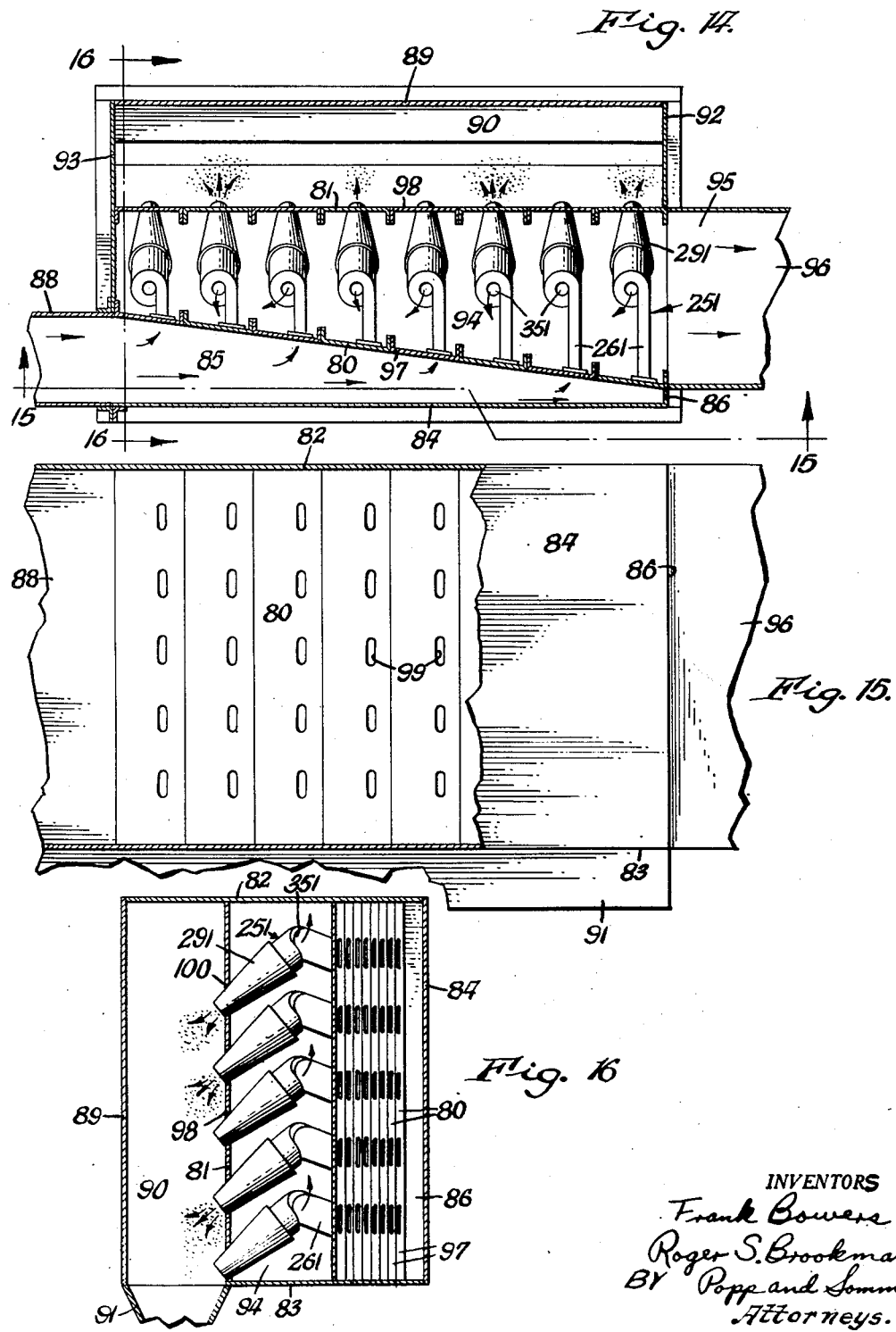

Patented June 30, 1953

2,643,737

UNITED STATES PATENT OFFICE 2,643,737

APPARATUS FOR SEPARATING PARTICLES FROM GASES

Frank Bowers, Williamsville, and Roger S. Brookman, East Aurora, N. Y., assignors to Dustex Corporation, Buffalo, N. Y., a corporation of New York Application July 6, 1950, Serial No. 172,294

7 Claims. (Cl. 183—83)

This invention relates to improvements in apparatus for separating suspended particles from gases and more particularly to apparatus for separating the particles centrifugally.

It has been proposed heretofore to centrifugally separate suspended particles from gases by introducing the particle laden gas into a plurality of cyclone type tube separators arranged in tiers across tube sheets and in which the inlets for the cyclone type tube separators were arranged between the tube sheets thereby requiring the particle laden air to flow around the external surfaces of these tube separators. Such an arrangement produced excessive wear of the tube separators and also prevented a smooth flow of particle laden gas thereby producing eddy currents which caused plugging and build-up of the particles.

It is therefore the principal object of the present invention to provide apparatus for centrifugally separating suspended particles from gases which overcomes the above noted defects and disadvantages of prior devices; more specifically providing an apparatus in which obstruction to the flow of the particle laden gas is reduced and also particle laden gas is not permitted to engage and hence wear the external surfaces of the tube separators, all to the end of providing a more efficient apparatus.

A further object is to provide a cyclone or centrifugal type separator which can be fabricated of sheet metal thereby permitting of the use of temperature resistant materials so that the separator can handle a material having a high temperature.

A further object is to provide apparatus for centrifugally separating suspended stringy or fibrous particles from gases with less tendency to catch and build up such particles than with separating apparatus as heretofore constructed.

A further object is to provide such an improved apparatus which requires a relatively small amount of floor space and the capacity of which can be increased without taking up additional floor space.

Another aim is to provide such an improved apparatus which is readily accessible for cleaning or repair.

Other objects and advantages of the invention will be apparaent from the following detailed description and accompanying drawings wherein:

Fig. 1 is a vertical sectional view through apparatus embodying one form of the invention.

Fig. 2 is a vertical elevational view, with a portion broken away, of the inlet side thereof and taken on line 2—2, Fig. 1.

Fig. 3 is a vertical sectional view showing the particle discharge side thereof and taken generally on line 3—3, Fig. 1.

Fig. 4 is a generally horizontal sectional view thereof taken on line 4—4, Fig. 1.

Fig. 5 is an enlarged side elevational view, with parts broken away, of one of the cyclone units shown in Figs. 1-4.

Fig. 6 is an elevational view thereof looking at the top thereof as shown in Fig. 6 and along the axis of the cylindrical body portion thereof.

Fig. 7 is a longitudinal sectional view thereof taken on line 7—7, Fig. 5.

Fig. 8 is a similar longitudinal sectional view thereof taken on line 8—8, Fig. 6.

Figs. 9 and 10 are transverse sectional views thereof taken on the correspondingly numbered lines of Fig. 7.

Fig. 12 is a top plan view thereof with parts broken away to reveal inner structure.

Fig. 13 is a right side elevational view thereof.

Fig. 14 is a horizontal sectional view through apparatus embodying still another modification of the invention.

Fig. 15 is a vertical view thereof, partly in section and partly in elevation, and taken on line 15—15, Fig. 14.

Fig. 16 is a vertical transverse sectional view thereof taken on line 16—16, Fig. 15.

Figures 1–10

Figure 11:
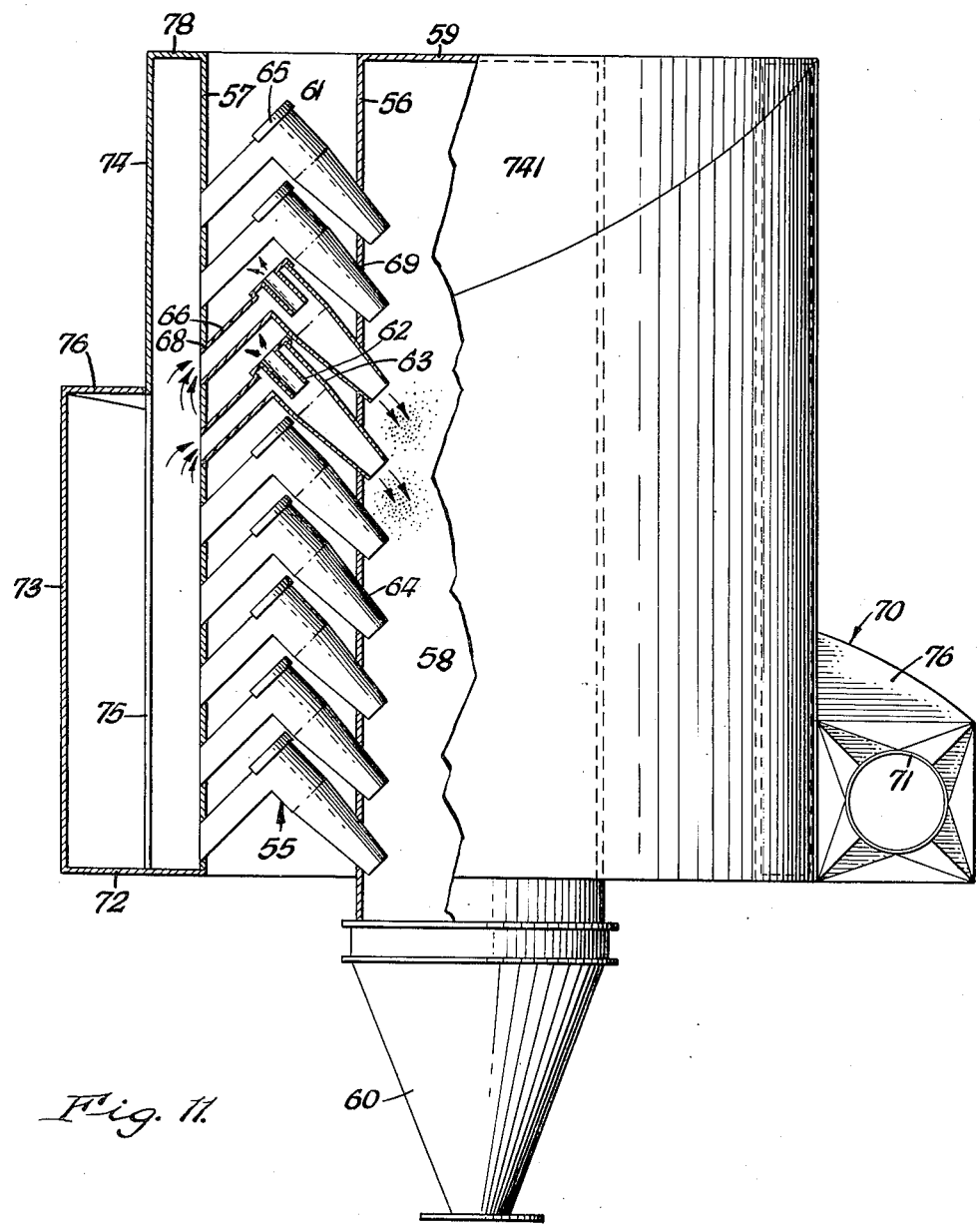
Fig. 11 is an end elevational view, partly in section, of apparatus embodying a modified form of the invention.

Referring to the apparatus shown in Figs. 1-10, and embodying one form of the invention, the apparatus is shown as comprising a box-like housing or casing fabricated of sheet metal panels including spaced front and rear tube sheets or walls, represented by the numerals 20 and 21 respectively; top and bottom walls 22 and 21 respectively; and side walls 24—24. Arranged between the vertical tube sheets are centrifugal separators or cyclone units, represented generally by the numeral 25. These cyclones 25 are shown as arranged one above the other in tiers or banks, six tiers being shown with seven cyclones in each tier.

Referring to Figs. 5-10, each cyclone 25 is shown as being fabricated of sheet metal parts and comprising an inlet tube 26 connected with one end of an outer cylindrical tubular body section 28, from the opposite end of which extends a frusto-conical tubular section 29. The inlet tube 26 is shown as being of vertically elongated rectangular form in cross section, the outer end of which forms an inlet opening or mouth 30 surrounded by an outwardly turned flange 27 for attachment purposes as hereinafter explained.

The upper edge 31 of the outer cylindrical body section 28 rises helically upwardly from a place of juncture with the lower wall 262 of the inlet tube 26 through one convolution to a juncture with the upper wall 263 of this inlet tube.

Arranged concentrically within the outer cylindrical body portion 28 is an inner cylindrical tube 32 forming an outlet pipe for the cleaned gases. The upper edge 33 of this inner cylindrical tube 32 is shown as being helical and parallel with the helical edge 31 of the outer cylindrical body section 28. The inner and outer cylindrical tubes 28 and 32 are joined by an end wall 34 connected to the helical edges 31 and 33 of these tubes. This end wall 34 is in the form of a helical strip of one convolution forming a continuation of the upper wall 263 of the inlet tube 26 and connecting at an acute angle with the lower wall 262 of this inlet tube.

Referring to Figs. 7 and 8, it will be seen that the outer and inner cylindrical tubes 28 and 32 respectively form cylindrical extensions of the outer and inner side walls 264 and 265 respectively of the inlet tube 26, merging tangentially therewith. Also, these cylindrical tubes 28 and 32 define between them an annular separation chamber 37.

The outlet opening at the upper end of the inner tube 32 is designated at 35 and the inlet opening at the lower end of this tube 32 is designated at 36 and is shown as arranged about at the level of the lower end of the outer cylindrical body section 28.

In joining the upper larger end of the frusto-conical tubular section 29 with the lower end of the outer cylindrical tubular body section 28, the latter is preferably ground off to provide a downwardly and inwardly tapering annular face 38 to engage with the upper marginal portion of the inner face of this section 29. In this manner a simple, strong and tight joint can be obtained, the parts being preferably welded together. The lower end of the frusto-conical tubular section 29 is open and forms an outlet designated at 39.

While any suitable form of cyclone or centrifugal separator may be employed in the practice of the invention, the cyclone 25 has been found to be particularly effective and has the advantages of being constructed of sheet metal parts welded together. Because sheet metal is used to fabricate the cyclone instead of casting the same, as of aluminum for example, commercially available sheet metal alloys resistant to high temperatures can be employed.

Referring again to Figs. 1–4, the cyclones 25 in each vertical bank or tier are shown as having their inlet tubes 26 connected to a relatively shallow broad based elongated channel member 40 and the frusto-conical sections 29 of these cyclones are shown as connected to a similar relatively shallow broad based elongated channel member 41. The relatively broad web of each of the channel members 40 is provided with a series of longitudinally spaced inlet openings 42 each of which registers with the opening 30 of the inlet tube 26 of one of the cycloes 25, the attaching flange 27 at the mouth of this tube engaging the inner surface of this web and being welded thereto. The web of each of the channel members 41 is provided with a series of longitudinally spaced openings 43 through each of which the outer end of the frusto-conical section 29 of one of the cycles 25 extends and these sections are preferably welded to this web.

It will be seen that each pair of opposing channel members 40 and 41 together with the interposed tier of cycles 25 forms a rigid unitary structure which can be readily withdrawn and replaced without disturbing the other banks. The flanges of the channel members 40 and 41 are shown as projecting toward each other and these flanges of adjacent channel members can be removably connected together in any suitable manner as by bolts and nuts (not shown).

It will also be noted that the webs of the channel members 40 and 41, being contiguous to one another respectively form the pair of parallel spaced continuous walls or tube sheets 21 and 20 respectively.

An inlet duct 44 is shown as connected to the tube sheet 21 to permit of horizontal flow of particle laden gases directly into the inlet openings 42 in the tube sheet 21. Any other suitable feed of particle laden gases can be employed, if desired, such as an inlet duct introducing the particle laden gases vertically upwardly or downwardly, or laterally from either side, to the inlet openings 42 in the tube sheet 21.

The compartment or chamber 45 between the tube sheets 20 and 21 is shown as having an outlet 46 at the upper end of the apparatus, this outlet extending across the full width of the apparatus as shown in Fig. 3.

A hood 48 is shown as covering the exposed discharge ends of the cyclones 25 and connected with a hopper 49 at its lower end. The space 50 between the tube sheet 20 and the hood 48 forms a compartment or chamber into which the concentrated particles taken from the incoming gases are discharged.

In operation of the apparatus shown in Figs. 1–10, particle laden gases are fed by the inlet duct 44 into the inlet openings 42 in the rear tube sheet 21, thence into the inlet tubes 26 of the various cyclones 25. In each cyclone 25 the particle laden gases are led into the annular separation chamber 37 in which the particles are centrifugally separated from the gases. The separated particles move spirally toward the discharge opening 39 from which they are discharged into the chamber 50 and collected in the hopper 49. The cleaned gases enter the inlet 36 of the inner tube 32 of the cyclone and are exhausted through the opening 35 into the compartment or chamber 45 from whence these cleaned gases are exhausted through the outlet 46.

An important feature of the invention is that the cyclones 25 are arranged between the tube sheets 20 and 21 and across the collecting chamber 45 for the cleaned gases. Since the cleaned gases are free or relatively free of particles, the external surfaces of these cyclones are not abraded by the particles and hence wear is reduced. Moreover such an apparatus minimizes change in direction of flow of the incoming particle laden gases and thus eddy currents with attending plugging and build-up are avoided.

*Figures 11–13*

Figs. 11–13 show apparatus in which cyclone units 55 are arranged radially between inner and outer concentric spaced cylindrical tube sheets 56 and 57 respectively. These tube sheets are shown as arranged with their common axis vertical. The central cylindrical chamber 58 surrounded by the inner tube sheet 56 is shown as covered at its upper end with an end head 59 and with its lower end open and connected with a hopper 60. The annular space 61 between the tube sheets 56 and 57 is shown as being open at its opposite ends.

Referring to Fig. 11, each cyclone 55 is shown as comprising inner and outer cylindrical concentric spaced tubes 62 and 63 respectively to define therebetween an annular separation chamber, a frusto-conical tubular section 64 connected to the lower end of the outer tube 33, an end head 65 connecting the tubes 62 and 63 and closing off the upper end of the annular separation chamber, and an inlet tube 66 connected tangentially with this annular separation chamber adjacent the end head 65. The outer end or mouth portion of each inlet tube 66 is shown as fitted into an opening 68 in the outer tube sheet 57. Similarly the outer end of the tapered section 64 of each cyclone 55 is shown as arranged in an opening 69 in the inner tube sheet 56 so as to project partially into the central chamber 58. The inlet tubes 66 are shown as inclining upwardly and inwardly and the main body of each cyclone 55 has its axis inclining downwardly and inwardly, with respect to the vertical axis of the apparatus.

While any suitable means may be employed for introducing or feeding particle laden gases into the inlet tubes 66 of the cyclones 55, the means shown for this purpose comprises a scroll-like duct 70 of progressively enlarging cross-section. The inlet end 71 of the duct 70 is arranged at the lower end of the tube sheets 56 and 57 and the bottom wall 72 of this duct forms a continuous annular horizontal outwardly extending flange from the lower end of the outer tube sheet 57. The height of the outer side wall 73 of this duct gradually increases to the full height of the outer tube sheet 57 in one convolution or 360 degrees while spiraling inwardly toward the axis of the inner cylindrical tube sheet 56. Beginning at the inlet 71, the inner wall 74 of the duct 70 extends vertically the full height of the outer cylindrical tube sheet 57 and concentric therewith during the first one half convolution or 180 degrees, in a counterclockwise direction. Beginning at the left hand side of Fig. 12 as indicated at 75 and continuing in a counterclockwise direction through the next 180 degrees that portion of this inner wall 74 surrounded by the opposing outer wall 73, is omitted; but above the upper wall 76 of this duct 70, a semicircular wall 74I of progressively decreasing height continues as an upper extension of the inner wall 74.

This inner cylindrical wall 74 and its concentric extension 74I are spaced from the outer tube sheet 57 to provide an annular space therebetween and at its upper end this annular space is covered by an annular end head 78 and at its lower end by the bottom wall 72, as shown in Fig. 11.

If desired, the floor or bottom wall 72 of the scroll-like duct 70 can be provided with means to skim off any build-up of particles on this floor, such means not being shown in the drawings.

In the operation of the apparatus shown in Figs. 11-13, particle laden gases are conducted into the inlet 71 of the scroll-like duct 70 and because of the progressively enlarging cross sectional area of this duct the velocity of the incoming gases is reduced. After passing through 180 degrees, the incoming gases are permitted access to the inlet openings of the inlet tubes 66 of the cyclones 55. Separation of the particles from the gases takes place by centrifugal action in these cyclones, the cleaned gases being exhausted through the outlet tubes 62 into the annular space 61 and the concentrated separated particles being discharged into the chamber 58 and collected in the hopper 60.

It will be noted that the incoming particle laden gases move upwardly and into the inlet tubes 66 of the cylones 55 because of the shape of the scroll-like duct 70.

Figures 14-16

Figs. 14-16 show apparatus in which cyclone units 25I are arranged in tiers between spaced tube sheets 80 and 81 which are not parallel to each other, as their counterparts 20 and 21 were the form of the invention shown in Figs. 1-10. The cyclones 25I are similar to the cyclones 25 shown in Figs. 1-10 and hence a detailed description of the same will not be here repeated, it being sufficient to point out that the inlet tubes 26I of the cyclones 25I are of varying length, as shown in Fig. 14. Otherwise, the cyclones 25 and 25I are the same and hence similar reference numerals have been employed to indicate like parts in the cyclones 25I except for the addition of the digit one.

Referring to Figs. 14-16, between top and bottom walls 82, 83 respectively, an outer side wall 84 is shown as arranged opposite the tube sheet 80 and in spaced relation thereto and at an angle thereto so as to provide a progressively narrowing inlet passage 85. The narrow end of this passage 85 is closed by an end wall 86 and the opposite wider end of this passage is connected to a feed conduit 88.

Another outer side wall 89 is shown as arranged opposite the tube sheet 81 and in spaced parallel relation thereto so as to provide a compartment or chamber 90, closed at its upper end by the top wall 82 and open at its bottom and connected with a collecting hopper 91. One end of this chamber 90 is closed by an end wall 92 and the opposite end is closed by an end wall 93. This end wall 93 also closes off the narrow end of the compartment or chamber 94 between the tube sheets 80 and 81, the opposite larger end of this compartment being open to provide an outlet 95 and connected with an exhaust duct 96.

The tube sheets 80 and 81 are composed respectively of contiguously arranged shallow relatively broad elongated channel members 97 and 98 suitably connected together in a manner similar to that described for the channel members 40 and 41 in the form of the invention shown in Figs. 1-10. The channel members 97 are shown as provided with a series of longitudinally spaced openings 99 which register with the mouths of the inlet tubes 26I. The channel members 98 are provided with a series of longitudinally spaced openings 100 through which extend the end portions of the tapered sections 29I of the cyclones 25I. The cyclones 25I are suitably connected as by welding with the channel members 97 and 98 at their places of engagement therewith.

As in the case of the form of the invention shown in Figs. 1-10, the cyclones 25I are arranged in tiers or banks, eight tiers of cyclones being shown with five cyclones in each tier. The number of cyclones in each bank and the number of banks can be varied to suit the needs of a particularly installation, without departing from the invention.

In the operation of the apparatus shown in Figs. 14–16, particle laden gases are introduced through the feed conduit 88 into the inlet passage 85. The particle laden gases then enter the inlet tubes 261 of the cyclones 251 through the openings 99 in the tube sheet 80. The cyclones 251 then by centrifugal action separate the particles from the gases, discharging the cleaned gases through the openings 351 into the chamber 94 from whence these cleaned gases are exhausted through the outlet 95. The concentrated separated particles are discharged through the outlets of the tapered sections 291 of the cyclones 251 into the chamber 90 and collected in the hopper 91.

As with the other forms of the invention, it will be seen that the apparatus shown in Figs. 14–16 exhausts the cleaned gases into the space between the tube sheets and across which the cyclones 251 are arranged so that contact of particle laden gases with the external surfaces of these cyclones is obviated and hence abrasion reduced, as well as avoiding the production of eddy currents in the flow of particle laden gases and attending deposition or build-up of particles.

We claim:

1. In apparatus for separating suspended particles from gases, the combination comprising a plurality of pairs of spaced channel members each having spaced flanges connected by a web, said webs being provided with openings, and a series of centrifugal separators arranged between each of said pairs of channel members, the inlets of said series of centrifugal separators being connected with the openings in the web of one of said channel members and their outlets for the separated particles being connected with the openings in the web of the other of said channel members in the corresponding pair of the same, channel members of adjacent pairs of the same having their said flanges engaging one another so that the webs of said channel members provide a pair of spaced walls, the cleaned gases being exhausted by said centrifugal separators into the space between said spaced walls.

2. In apparatus for separating suspended particles from gases, the combination comprising a pair of spaced elongated channel members each having spaced flanges connected by a web, each of said webs being provided with a series of longitudinally spaced openings, and a series of centrifugal separators arranged between said webs and having their inlets connected with the openings in one of said webs and their outlets for the separated particles connected with the openings in the other of said webs, the cleaned gases being exhausted by said centrifugal separators into the space between said channel members.

3. In apparatus for separating suspended particles from gases, the combination comprising a plurality of individually removable units arranged in side by side relation, each of said units comprising a pair of spaced elongated channel members each of which has spaced flanges connected by a web, each of said webs being provided with a series of longitudinally spaced openings, and a series of centrifugal separators arranged between said webs and having their inlets connected with the openings in one of said webs and their outlets for the separated particles connected with the openings in the other of said webs, the cleaned gases being exhausted by said centrifugal separators into the space between said channel members, the flanges of each of said units engaging the opposing flanges of the adjacent one of said units.

4. Apparatus for separating suspended particles from gases, comprising a plurality of individually removable units arranged in side by side relation, each of said units comprising a pair of spaced elongated channel members each of which has spaced flanges connected by a web, each of said webs being provided with a series of longitudinally spaced openings, and a series of centrifugal separators arranged between said webs and having their inlets connected with the openings in one of said webs and their outlets for the separated particles connected with the openings in the other of said webs, the flanges of each of said units engaging the opposing flanges of the adjacent one of said units so that said channel members provide a pair of spaced walls, the cleaned gases being exhausted by said centrifugal separators into the space between said walls, means arranged to introduce particle laden gases into said openings in one of said walls on the side thereof opposite from said space, and means arranged to collect the separated particles discharged through said openings in the other of said walls on the side thereof opposite from said space.

5. Apparatus for separating suspended particles from gases, comprising inner and outer spaced annular tube sheets having openings therein, a plurality of cyclone separators arranged in the space between said tube sheets and having their inlets connected with the openings in said outer tube sheet and their outlets for the separated particles connected with the openings in said inner tube sheet and their outlets for the cleaned gases communicating with the entire space between said tube sheets unoccupied by said cyclone separators, a scroll-like duct surrounding said outer tube sheet for feeding particle laden gases into said openings in said outer tube sheet, and means arranged to collect the separated particles discharged through said openings in said inner tube sheet into the internal space of said inner tube sheet, whereby the cleaned gases are discharged into said entire space between said tube sheets unoccupied by said cyclone separators and the particle laden gases and the separated particles are excluded from such space.

6. Apparatus for separating suspended particles from gases, comprising a pair of flat tube sheets arranged at an angle to each other so as to provide a divergent space therebetween, each of said tube sheets having openings therein, a plurality of cyclone separators arranged in the space between said tube sheets and having their inlets connected with the openings in one of said tube sheets and their outlets for the separated particles connected with the openings in the other of said tube sheets and their outlets for the cleaned gases communicating with the entire space between said tube sheets unoccupied by said cyclone separators, an inlet chamber communicating with said openings in said one of said tube sheets and of degressive cross-sectional area in the direction of flow of the incoming particle laden gases, said divergent space between said tube sheets having an outlet at the larger end thereof for the cleaned gases, and means arranged to collect the separated particles discharged through said openings in said other of said tube sheets on the side thereof opposite from said divergent space, whereby the cleaned gases are discharged into said entire space between said tube sheets unoccupied by said cyclone separators and the particle laden gases and the separated particles are excluded from such space.

7. Apparatus for separating suspended particles from gases, comprising spaced tube sheets having openings therein, a plurality of cyclone separators arranged in the space between said tube sheets and completely spaced from one another and each including a tubular body having an outlet at one end for the separated particles, an outlet pipe for the cleaned gases at the other end of said body and projecting thereinto to provide an annular space between said outlet pipe and body and an inlet tube connected generally tangentially with said body and communicating with said annular space, said inlet tubes being connected with the openings in one of said tube sheets, said outlets being connected with the openings in the other of said tube sheets, and said outlet pipe being in communication with the entire space between said tube sheets unoccupied by said cyclone separators, means arranged to introduce particle laden gases into said openings in said one of said tube sheets on the side thereof opposite from said cyclone separators, and means arranged to collect the separated particles discharged through said openings in said other of said tube sheets on the side thereof opposite from said cyclone separators, whereby the cleaned gases are discharged into said entire space between said tube sheets unoccupied by said cyclone separators and the particle laden gases and the separated particles are excluded from such space.

FRANK BOWERS.
ROGER S. BROOKMAN.

References Cited in the file of this patent

UNITED STATES PATENTS

| Number | Name | Date |
|---|---|---|
| 2,119,478 | Whiton | May 31, 1938 |
| 2,182,854 | Pfeffer et al. | Dec. 12, 1939 |
| 2,323,707 | Danz | July 6, 1943 |
| 2,553,175 | Davenport | May 15, 1951 |

FOREIGN PATENTS

| Number | Country | Date |
|---|---|---|
| 328,653 | Great Britain | May 2, 1930 |
| 433,085 | Germany | Sept. 15, 1926 |